United States Patent [19]

Murakoso et al.

[11] Patent Number: 4,856,603

[45] Date of Patent: Aug. 15, 1989

[54] ELECTRONIC WEIGHING INSTRUMENT OF THE ELECTROSTATIC CAPACITY TYPE

[75] Inventors: Toshiyuki Murakoso, Mishima; Shoichi Sato, Tokyo; Motoi Yagi, Zushi, all of Japan

[73] Assignee: Tokyo Electric, Co., Ltd., Tokyo, Japan

[21] Appl. No.: 288,557

[22] Filed: Dec. 22, 1988

[30] Foreign Application Priority Data

Dec. 23, 1987 [JP] Japan ................................ 62-323741

[51] Int. Cl.⁴ .............................................. G01G 3/14
[52] U.S. Cl. ............................ 177/210 C; 177/210 FP
[58] Field of Search ...................... 177/210 C, 210 FP; 73/862.68

[56] References Cited

U.S. PATENT DOCUMENTS

| | | | |
|---|---|---|---|
| 3,595,329 | 7/1971 | Withnell et al. | 177/210 C |
| 3,604,525 | 9/1971 | Blethen et al. | 177/210 C |
| 3,979,581 | 9/1976 | Reuland | 177/210 C UX |
| 4,237,989 | 12/1980 | Lewis | 177/210 C |
| 4,294,321 | 10/1981 | Wittlinger et al. | 177/210 C X |
| 4,366,875 | 1/1983 | Dauge et al. | 177/210 FP X |
| 4,463,614 | 8/1984 | Lee | 177/210 C X |

*Primary Examiner*—George H. Miller, Jr.
*Attorney, Agent, or Firm*—Oblon, Spivak, McClelland, Maier & Neustadt

[57] ABSTRACT

The invention provides an electronic weighing instrument of the electrostatic capacity type which eliminates an influence on a measured weight value of a rate of change in oscillation frequency which is caused by environmental conditions such as an ambient temperature or a humidity. The electronic instrument comprises a pair of capacitors having capacitances which are differentially varied by a displacement caused by a load. The capacitors are alternately connected to the oscillating circuit at predetermined intervals of time, and each time either of the capacitors is connected to the oscillating circuit, an oscillation frequency is fetched from the oscillating circuit. Then, a difference and a sum between two different oscillation frequencies successively fetched from the oscillating circuit are calculated, and the difference is divided by the sum to obtain a measured weight value.

3 Claims, 4 Drawing Sheets

ELECTRONIC WEIGHING INSTRUMENT OF THE ELECTROSTATIC CAPACITY TYPE

FIELD OF THE INVENTION AND RELATES ART STATEMENT

This invention relates to an electronic weighing instrument of the electrostatic capacity type which detects a change in electrostatic capacity as a change in load.

An electronic weighing instrument is already known and disclosed, for example, in Japanese Patent Laid-Open No. 61-40517. Referring to FIG. 7, the electronic weighing instrument is shown and includes an oscillating circuit 3 including a comparator 1 and an integrator 2. The oscillating circuit 3 further includes a sensor S having a capacitance which is varied by a load applied thereto, and a dummy capacitor D having a capacitance subtantially equal to or a little smaller than the capacitance of the sensor S is a no load condition. The sensor S and the dummy capacitor D are alternately connected to a junction between the comparator 1 and the integrator 2 by means of a change-over switch 5 which operates under control of a microcomputer 4.

The microcomputer 4 operates in such a manner as illustrated in FIG. 8. Referring to FIG. 8, at first at the first step, the microcomputer 4 reads an oscillation frequency fdz of the oscillating circuit 3 when the dummy capacitor D is connected by the change-over switch 5. Then at the second step, the microcomputer 4 reads an oscillation frequency fsz of the oscillating circuit 3 when the sensor S is connected by the change-over switch 5. After then, a difference fz between fdz and fsz is calculated and stored in memory at the third step.

Subsequently at the fourth step, another oscillation frequency fd of the oscillating circuit 3 when the dummy capacitor D is connected again is read, and then at the fifth step, a further oscillation frequency of the oscillating circuit 3 when the sensor S is connected is read. After then, a difference fx between fd and fs is calculated and stored in memory at the sixth step.

Then at the seventh step, a difference fw between fx and fz is found out, and finally at the eighth step, fw is converted into a measured weight value, which is displayed on a display unit 6.

With the conventional weighing instrument, however, only a difference in oscillation frequency between the dummy capacitor D and the sensor S is detected. Accordingly, where a rate of change in oscillation frequency depending upon environmental conditions such as an ambient temperature or a humidity is represented by $\epsilon$, an error given by $$fx = fs(1+\epsilon) - fd(1+\epsilon)$$

will be caused by the rate $\epsilon$ of change.

OBJECT AND SUMMARY OF THE INVENTION

It is an object of the present invention to provide an electronic weighing instrument of the electrostatic capacity type wherein an influence on a measured weight value of a rate $\epsilon$ of change in oscillation frequency can be eliminated with certainty the accuracy in measurement can be improved.

In order to attain the object, according to the present invention, there is provided an electronic weighing instrument which comprises first and second capacitors having capacitances which are differentially varied by a displacement caused by a load, an oscillating circuit including said first and second capacitors each as an element for determining an oscillation frequency thereof, a capacitor changing over means for alternately connecting said first and second capacitors to said oscillating circuit at predetermined intervals of time, and an operating means for fetching an oscillation frequency from said oscillating circuit each time said first and second capacitors are alternately connected to said oscillating circuit by said capacitor changing over means, calculating a difference and a sum between two different frequencies fetched successively from said oscillating circuit and dividing the difference by the sum to obtain a measured weight value.

With the electronic weighing instrument of the present invention, as the first and second capacitors are alternately connected to the oscillating circuit by the capacitor changing over means, different frequencies, for example, $f_1$ and $f_2$, are successively fetched from the oscillating circuit. Thus, by calculating $|f_2-f_1|/(f_1+f_2)$, an amount of change of the capacitors with respect to a load can be found out, and after all, a measured weight value can be found out. Where a rate of change in oscillation frequency caused by environmental conditions is represented by $\epsilon$, a calculation of an expression $|f_2(1+\epsilon)-(f_1(1+\epsilon)|/\{f_1(1+\epsilon)+f_2(1+\epsilon)\}$ is performed. Accordingly, an influence on a measured weight value of the rate of change $\epsilon$ can be eliminated with certainty comparing with a conventional electronic weighting instrument wherein merely a difference in frequency is calculated.

The above and other objects, features and advantages of the present invention will become apparent from the following description and the appended claims, taken in conjunction with the accompanying drawings.

DETAILED DESCRIPTION OF THE PREFERRED EMBODIMENTS

Figure 1:
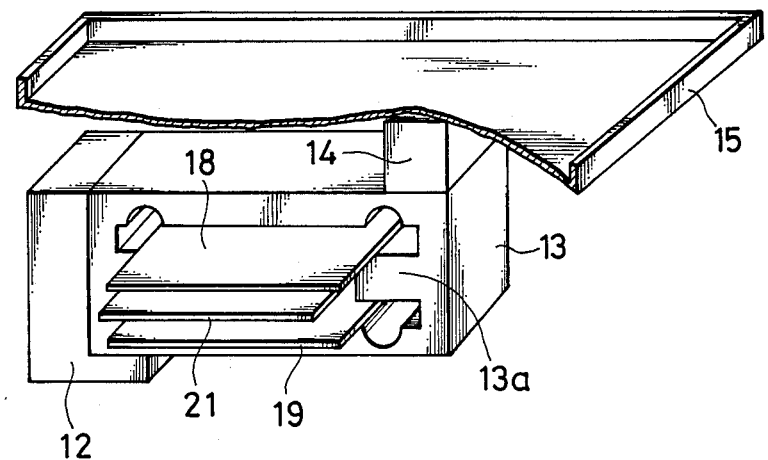
FIG. 1 is a perspective view, partly broken, of an electronic weighing instrument of the electrostatic capacity type showing a preferred embodiment of the present invention.
Figure 2:
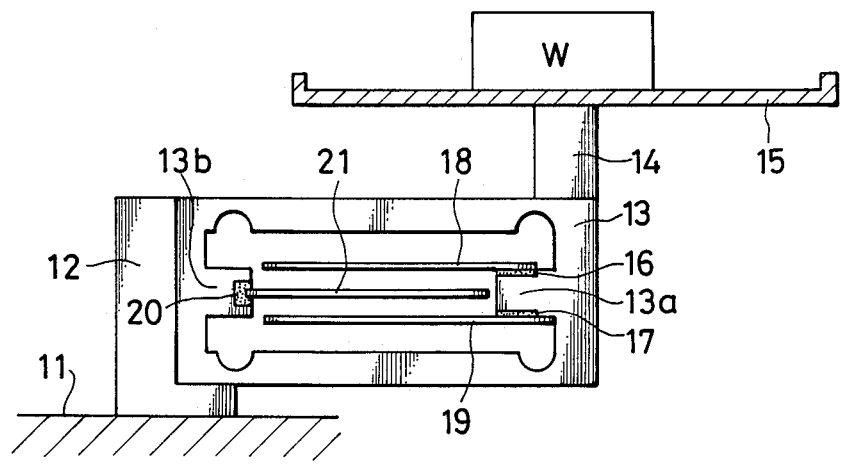
FIG. 2 is a schematic side elevational view of the electronic weighing instrument of FIG. 1.

Referring first to FIGS. 1 to 4, there is shown an electronic weighing instrument of the electrostatic capacity type to which the present invention is applied. Referring first to FIGS. 1 and 2, the electronic weighing instrument shown includes a support member 12 secured uprightly to a base 11, and distortion yielding member 13 having an end secured to the support member 12. A scale plate 15 is secured to an upper face of the other end portion of the distortion yielding member 12 by way of a supporting member 14.

The distortion yielding member 13 has a hollow formed at a side portion thereof, and a projection 13a is formed on an inner wall of the hollow of the distortion yielding member 13 adjacent the scale plate 15 while another projection 13b is formed on an opposing inner wall of the hollow adjacent the support member 12.

A pair of electrode plates 18 and 19 are secured at one ends thereof to upper and lower faces of the projection 13a of the distortion yielding member 13 via insulating members 16 and 17, respectively. Meanwhile, another electrode 21 is secured at one end thereof to the center of an end face of the other projection 13b via an insulating member 20. The electrode plates 18, 19 and 21 extend in a substantially parallel, opposing and spaced relationship by a predetermined distance from each other with the electrode plate 21 positioned between the electrode plates 18 and 19.

If a load W is applied to the scale plate 15, the distortion yielding member 13 is distorted so that the distance between the electrode plates 18 and 21 is decreased from its initial value in an initial condition when no load is applied to the scale plate 15 while the distance between the electrode plates 19 and 21 is increased from its initial value. The distances between the electrode plates 18 and 21 and the electrode plates 19 and 21 are changed differentially by a load applied to the distortion yielding member 13.

It is to be noted that even if the locations of the electrode plates 18 and 19 and the electrode plate 21 at which they are mounted on the distortion yielding member 13 are reversed, there is no trouble although the changes in distance between the electrode plates 18 and 21 and the electrode plates 19 and 21 upon application of a load are also reversed.

A first capacitor $C_1$ is formed by the electrode plates 18 and 21 while a second capacitor $C_2$ is formed by the electrode plates 19 and 21. The capacitors $C_1$ and $C_2$ are variable capacitors because the distances between the individual adjacent electrodes 18, 19 and 20 are changed to vary the capacitances of the capacitors $C_1$ and $C_2$.

Figure 3:
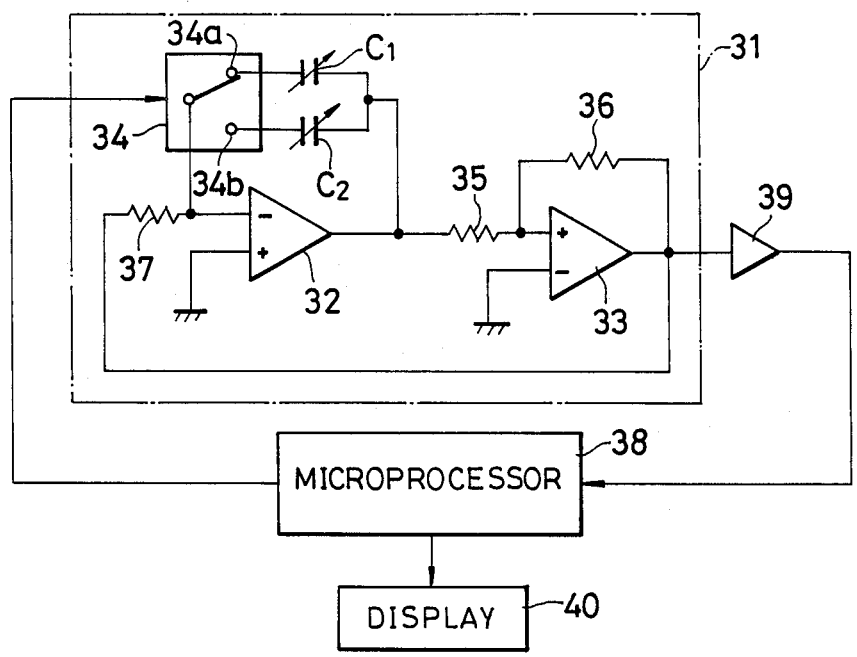
FIG. 3 is a circuit diagram of an electric circuit of the electronic weighing instrument of FIG. 1.
Figure 4:
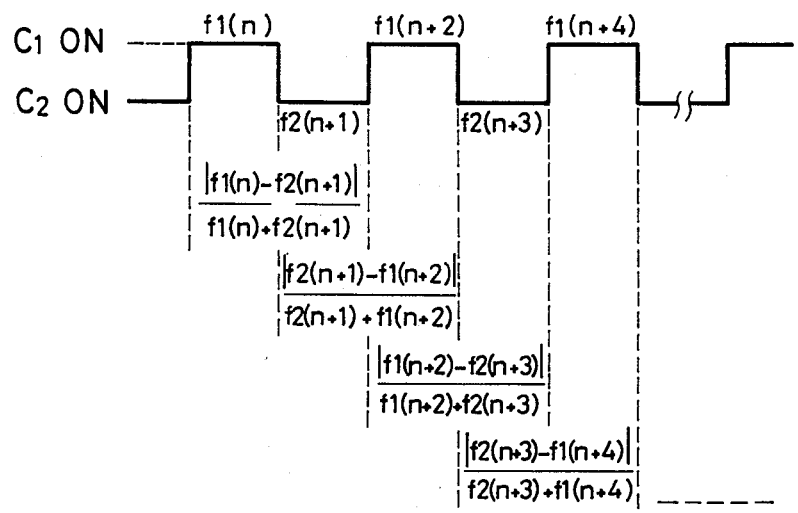
FIG. 4 is a diagram illustrating a relationship between changing over operations of a switch and calculating processings of a microprocessor of the electric circuit of FIG. 3.

Referring now to FIG. 3, there is shown an electric circuit of the electronic weighing instrument described above with reference to FIGS. 1 and 2. The electric circuit shown includes an oscillating circuit 31 consisting of a pair of operational amplifiers 32 and 33, the capacitors $C_1$ and $C_2$ described above, and a change-over switch 34. The operational amplifier 32 has an output terminal connected to a non-negated input terminal (+) of the other operational amplifier 33 by way of a resistor 35 while an output terminal of the other operational amplifier 33 is connected to a non-negated input terminal (+) of the operational amplifier 33 by way of another resistor 36 and also to a negated input terminal (−) of the operational amplifier 32 by way of a further resistor 37.

A non-negated input terminal (+) of the operational amplifier 32 and a negated input terminal (−) of the other operational amplifier 33 are both grounded.

The first and second capacitors $C_1$ and $C_2$ are connected in parallel between the non-negated input terminal (+) and the output terminal of the operational amplifier 32 via switching contacts 34a and 34b of the change-over switch 34, respectively.

The change-over switch 34 is connected to be controlled by a microprocessor 38 such that it makes a changing over operation between the switching contacts 34a and 34b thereof at predetermined intervals of time.

An oscillation frequency of the oscillating circuit 31 is fetched into the microprocessor 38 by way of a buffer 39, and a measured weight value is calculated in the microprocessor 38 and indicated on a display unit 40.

With the circuit construction described above, where an area of each of opposing faces of the electrode plates 18 and 21 constituting the first capacitor $C_1$ is represented by S, a distance between the electrode plates 18 and 21 by $d_1$ while an area of each of opposing faces of the electrode plates 19 and 21 constituting the second capacitor $C_2$ is represented similarly by S and a distance between the electrode plates 19 and 21 by $d_2$, capacitances of the first and second capacitors $C_1$ and $C_2$ are respectively given by $$C_1 = \epsilon_0 S / d_1 \tag{1}$$

$$C_2 = \epsilon_0 S / d_2 \tag{2}$$

In the equations (1) and (2) above, $\epsilon_0$ represents a dielectric constant of the air.

Meanwhile, when a load W is applied so that the distortion yielding member 13 is distorted by an amount $\Delta d$, then the capacitances of the first and second capacitors $C_1$ and $C_2$ are changed respectively to $$C_1 = \epsilon_0 S / (d_1 - \Delta d) \tag{3}$$

$$C_2 = \epsilon_0 S / (d_2 - \Delta d) \tag{4}$$

Further, where an oscillation frequency of the oscillating circuit 31 when the change-over switch 34 is changed over to the switching contact 34a side is represented by $f_1$ and another oscillation frequency of the oscillating circuit 31 when the change-over switch 34 is changed over to the other switching contact 34b side is represented by $f_2$, they are given respectively by $$f_1 = \frac{R_3}{4 R_1 R_2} \cdot \frac{1}{C_1} \tag{5}$$

$$f_2 = \frac{R_3}{4 R_1 R_2} \cdot \frac{1}{C_2} \tag{6}$$

In the equations (5) and (6) above, $R_1$ is a resistance value of the resistor 37, $R_2$ a resistance value of the resistor 35, and $R_3$ a resistance value of the resistor 36.

If an example is given, where the distance $d_1$ between the electrode plates 18 and 21 is 0.9 mm, the distance $d_2$ between the electrode plates 19 and 21 is 0.6 mm, the area S of an opposing face of the electrode plate 19 is 4×6 cm, the amount $\Delta d$ of distortion is 0.3 mm, the resistance value $R_1$ is 72 kΩ, the resistance value $R_2$ is 5.1 kΩ and the resistance value $R_3$ is 12 kΩ, the frequency $f_1$ is 231 kHz and $f_2$ is 347 kHz.

Here, $R_3/4R_1R_2$ is substituted for K (in the case of the example described above, $0.815 \times 10^{-5}$), and substituting the equations (1) and (3) into the equation (5) and the equations (2) and (4) into the equation (6), respectively, we obtain $$f_1 = K \cdot \frac{d_1}{\epsilon S} \text{ (no load applied)} \tag{7}$$

$$f_1 = K \cdot \frac{(d_1 - \Delta d)}{\epsilon S} \text{ (load applied)} \quad (8)$$

$$f_2 = K \cdot \frac{d_2}{\epsilon S} \text{ (no load applied)} \quad (9)$$

$$f_2 = K \cdot \frac{(d_2 + \Delta d)}{\epsilon S} \text{ (load applied)} \quad (10)$$

In accordance with the equations thus obtained, the microprocessor 38 calculates differences and sums between the oscillation frequencies $f_1$ and $f_2$. The differences are then divided by the sums to obtain results M, which are thus given by $$\begin{aligned} M &= \frac{|f_2 - f_1|}{f_2 + f_1} \\ &= \frac{|d_2 - d_1|}{d_2 + d_1} \text{ (not load applied)} \end{aligned} \quad (11)$$

$$\begin{aligned} M &= \frac{|f_2 - f_1|}{f_2 + f_1} \\ &= \frac{|d_2 - d_1 + 2\Delta d|}{d_2 + d_1} \\ &\frac{|d_2 - d_1|}{d_2 + d_1} + \frac{2\Delta d}{d_2 + d_1} \text{ (load applied)} \end{aligned} \quad (12)$$

Thus, since $\Delta d$ is an amount of distortion of the distortion yielding member 13 caused by a load applied thereto, a measured weight value can be calculated if M is found out.

Accordingly, with the electronic weighing instrument, as the change-over switch 34 makes alternate changing over operations at predetermined intervals of time in response to controlling signals from the microprocessor 38, the frequencies $f_1$ and $f_2$ are outputted alternately in a predetermined cycle from the oscillating circuit 31.

The microprocessor 38 thus fetches the frequencies $f_1$ and $f_2$ alternately and makes calculating operations with them. Where the frequency when the switching contact 34a side of the change-over switch 34 is turned on for the nth time is represented by $f_1(n)$, the frequency when the switching contact 34b side is turned on for the n+1th time is represented by $f_2(n+1)$, the frequency when the switching contact 34a side is turned on again for the n+2th time is represented by $f_2(n+2)$, the frequency when the switching contact 34b side is turned on for the n+3th time is represented by $f_2(n+3)$, the frequency when the switching contact 34a side is turned on for the n+4th time is represented by $f_1(n+4)$, and so on as illustratively shown in FIG. 3, the microprocessor 38 makes a following calculation $$\frac{|f_1(n) - f_2(n+1)|}{f_1(n) + f_2(n+1)}$$

at first for the n+1th time to obtain a measured weight value, which is subsequently indicated on the display unit 40.

Then for the n+2th time, the microprocessor 38 makes a following calculation $$\frac{|f_2(n+1) - f_1(n+2)|}{f_2(n+1) + f_1(n+2)}$$

to obtain a measured weight value, which is indicated on the display unit 40.

Further for the n+3th time, the microprocessor 38 makes a following calculation $$\frac{|f_1(n+2) - f_2(n+3)|}{f_1(n+2) + f_2(n+3)}$$

to obtain a measured weight value, which is indicated on the display unit 40.

For the n+4th time, the microprocessor 38 makes a following calculation $$\frac{|f_2(n+3) - f_1(n+4)|}{f_2(n+3) + f_1(n+4)}$$

to obtain a measured weight value, which is indicated on the display unit 40.

In this manner, each time the change-over switch 34 is changed over, the microprocessor 38 fetches a frequency from the oscillating circuit 31, calculates a difference and a sum between the frequency and another frequency fetched for the preceding time, and divides the difference by the sum to obtain a measured weight value.

Since the first capacitor $C_1$ and the second capacitor $C_2$ can be changed over by the change-over switch 34 to fetch a frequency from the single oscillating circuit 31 in this manner, the electronic weighing instrument may include only one oscillating circuit.

Further, since only changing over of the capacitors is effected in the single oscillating circuit 31, the rates $\epsilon$ of change in oscillation frequency caused by environmental conditions such as a temperature or a humidity are substantially equal to eahc other at the frequencies $f_1$ and $f_2$.

Besides, since the calculating processing of $$M = \frac{|f_2(1+\epsilon) - f_1(1+\epsilon)|}{f_2(1+\epsilon) + f_1(1+\epsilon)}$$

is executed by the microprocessor 38 in order to finally obtain a measured weight value, an influence on a measured weight value of the rate $\epsilon$ of change can be removed with certainty.

Moreover, since the frequencies $f_1$ and $f_2$ are oscillated and outputted only upon changing over of the switch 34, comparing with an alternative electronic weighing instrument wherein the two frequencies are always outputted, there is no interference between the two frequencies and there is no necessity of taking measures to electrically isolate oscillating circuits nor capacitors for the different frequencies from each other.

In addition, since the single electrode plate 21 can be used commonly for the capacitors $C_1$ and $C_2$, the number of electrode plates can be reduced by one.

Figure 5:
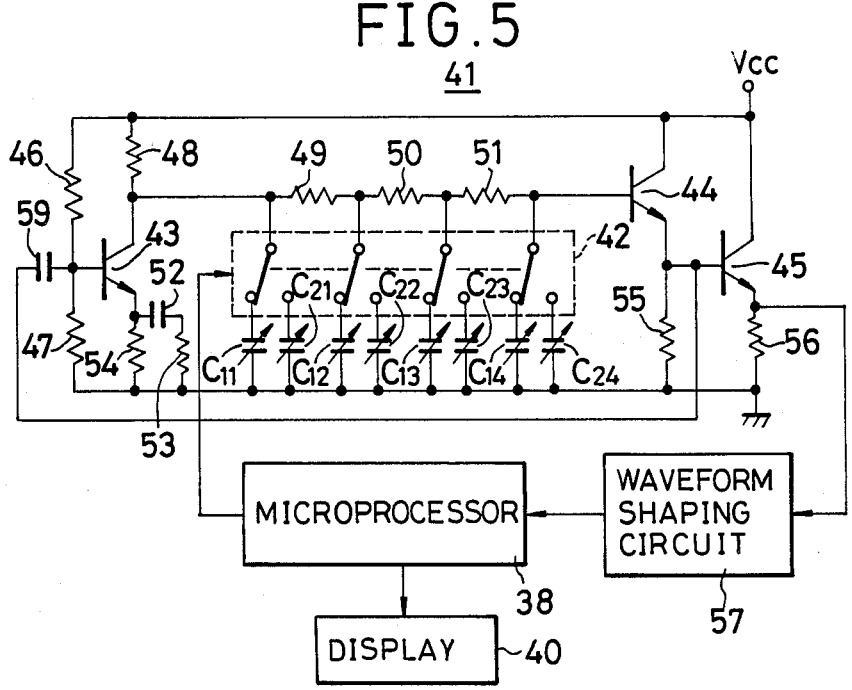
FIG. 5 is a circuit diagram showing another preferred embodiment of the present invention.

Referring now to FIG. 5, there is shown an electronic weighing instrument of the electrostatic capacity type according to a second embodiment of the present invention. The electronic weighing instrument includes an oscillating circuit including a first capacitor $C_1$ consisting of four capacitors $C_{11}$, $C_{12}$, $C_{13}$ and $C_{14}$ and a second capacitor $C_2$ consisting of four capacitors $C_{21}$, $C_{22}$, $C_{23}$ and $C_{24}$. The capacitors $C_{11}$, $C_{12}$, $C_{13}$, $C_{14}$ and $C_{21}$, $C_{22}$, $C_{23}$, $C_{24}$ are alternately changed over at predetermined intervals of time by means of a quadruple change-over switch 41. The oscillating circuit further includes three npn transistors 43, 44 and 45. The base of the transistor 43 is connected to a terminal Vcc by way of a resistor 46 and grounded by way of another resistor 47. The collector of the transistor 43 is connected to the terminal Vcc by way of a resistor 48 and also to the base of the transistor 44 by way of a series circuit of resistors 49, 50 and 51 while the emitter of the transistor 43 is grounded by way of a parallel circuit of a resistor 54 and a series circuit of another resistor 53 and a capacitor 52.

Meanwhile, the collector of the transistor 44 is connected directly to the terminal Vcc while the emitter of the transistor 44 is grounded by way of a resistor 55 and connected to the base of the transistor 43 by way of a capacitor 59.

The collector of the transistor 45 is directly connected to the terminal Vcc while the emitter of the transistor 45 is grounded by way of a resistor 56.

Common terminals of the quadruple change-over switch 42 are individually connected to a junction between the transistor 43 and the resistor 49, another junction between the resistors 49 and 50, a further junction between the resistors 50 and 51 and a still further junction between the resistor 51 and the base of the transistor 44.

Even where such a quadruple RC oscillating circuit 41 of the lagging type as described above is employed, sinusoidal waves of frequencies $f_1$ and $f_2$ can be outputted from the emitter of the transistor 45 at the last stage by changing over operation of the change-over switch 42. Such sinusoidal waves are shaped by a waveform shaping circuit 57 and fetched into a microprocessor 38 by which means similar calculating processings to those described hereinabove in connection with the electronic weighing instrument of the preceding embodiment are executed to find out a measured weight value.

Accordingly, even with the electronic weighing instrument of the present embodiment, similar effects to those of the electronic weighing instrument of the preceding embodiment can be attained.

Figure 6:
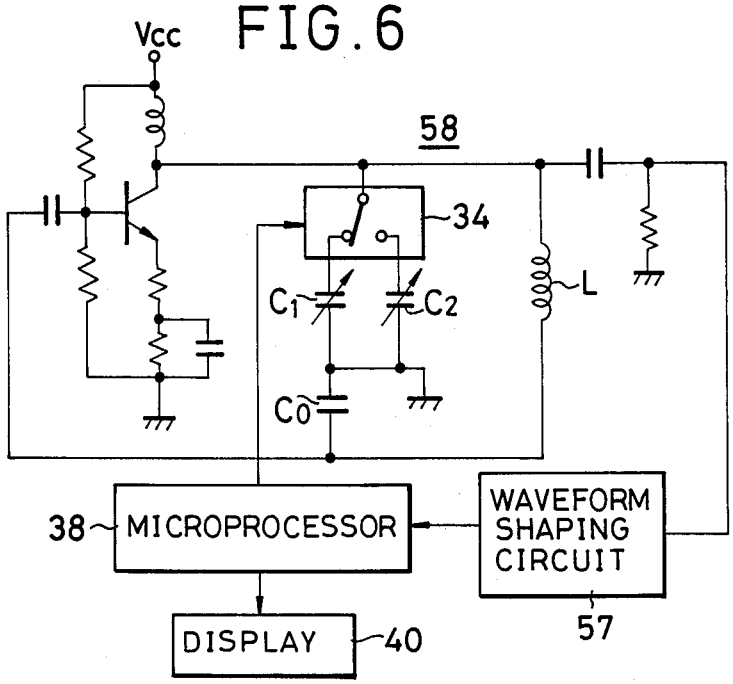
FIG. 6 is a circuit diagram showing a further preferred embodiment of the present invention.
Figure 7:
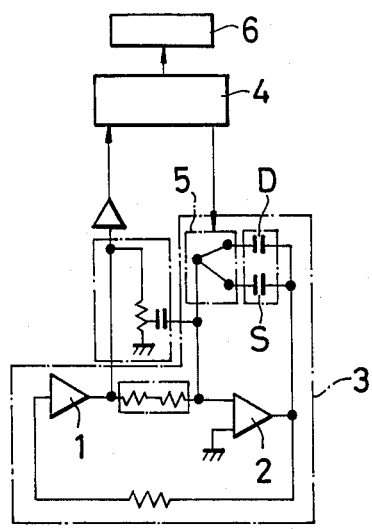
FIG. 7 is a circuit diagram showing a conventional electronic weighing instrument of the electrostatic capacity type.
Figure 8:
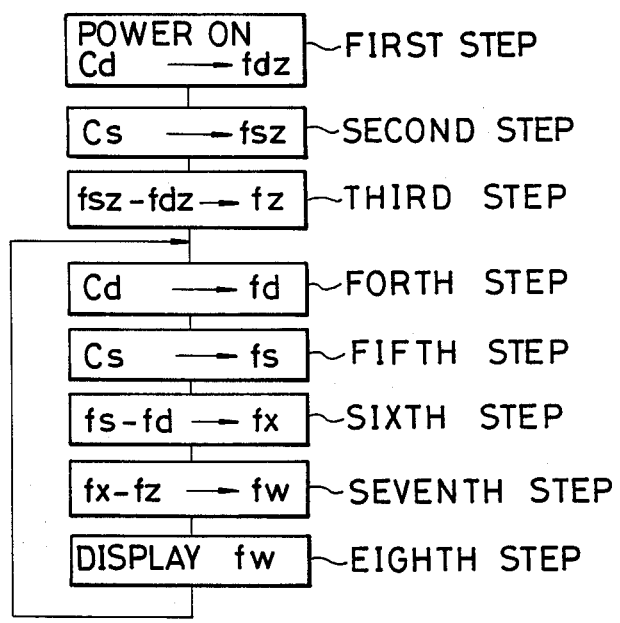
FIG. 8 is a flow chart illustrating processing steps of a microcomputer of the conventional electronic weighing instrument of FIG. 7.

Referring now to FIG. 6, there is shown an electronic weighing instrument of the electrostatic capacity type according to a third preferred embodiment of the present invention. The electronic weighing instrument employs a Colpitts oscillating circuit 58 wherein a first capacitor $C_1$, a second capacitor $C_2$, a further capacitor $C_0$ and an inductor L are used. Also with the oscillating circuit 58, sinusoidal waves of frequencies $f_1$ and $f_2$ are generated alternately by changing over operation of a change-over switch 34. The sinusodial waves are then shaped by a waveform shaping circuit 57 and fetched into a microprocessor 38. Accordingly, also with the electronic weighing instrument of the present embodiment, similar effects to those of the preceding embodiments can be attained.

As apparent from the foregoing described, according to the present invention, an electronic weighing instrument of the electrostatic capacity type can be provided wherein an influence on a measured weight value of a rate $\epsilon$ of change in oscillation frequency can be eliminated with certainty and accuracy in measurement can be improved.

What is claimed is:

1. An electronic weighing instrument, comprising first and second capacitors having capacitances which are differentially varied by a displacement caused by a load, an oscillating circuit including said first and second capacitors each as an element for determining an oscillation frequency thereof, a capacitor changing over means for alternately connecting said first and second capacitors to said oscillating circuit at predetermined intervals of time, and an operating means for fetching an oscillation frequency from said oscillating circuit each time said first and second capacitors are alternately connected to said oscillating circuit by said capacitor changing over means, calculating a difference and a sum between two different frequencies fetched successively from said oscillating circuit and dividing the difference by the sum to obtain a measured weight value.

2. An electronic weighing instrument according to claim 1, wherein said operating means calculates a measured weight value each time said capacitor changing over means makes a changing over operation such that an oscillation frequency from said oscillating circuit when said capacitor changing over means makes a changing over operation for the nth time and another oscillation frequency from said oscillation frequency when said capacitor changing over means makes a changing over operation for the n+1th time are fetched in order to calculate a measured weight value, and then the frequency from said oscillating circuit when said capacitor changing over means makes the changing over operation for the n+1th time and a further frequency from said oscillating circuit when said capacitor changing over means makes a changing over operation for the n+2th time are fetched in order to calculate another measured weight value.

3. An electronic weighing instrument according to claim 1 or 2, wherein said first and second capacitors are constituted from a plurality of electrode plates which are mounted in an integral relationship on a distortion yielding member that is displaced by a load and which are disposed in an opposing spaced relationship by a predetermined distance such that one of said electrode plates is used commonly for said first and second capacitors.

* * * * *